(12) United States Patent
Hirani et al.

(10) Patent No.: US 12,094,278 B2
(45) Date of Patent: Sep. 17, 2024

(54) ACCESS SYSTEM

(71) Applicant: Illinois Tool Works Inc., Glenview, IL (US)

(72) Inventors: Hitesh Hirani, Oldham (GB); Andy Alexander, Arborfield (GB)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/394,877

(22) Filed: Aug. 5, 2021

(65) Prior Publication Data

US 2022/0044508 A1 Feb. 10, 2022

(30) Foreign Application Priority Data

Aug. 7, 2020 (GB) ..................................... 2012346

(51) Int. Cl.
*G07C 9/22* (2020.01)
*G06F 21/34* (2013.01)
(Continued)

(52) U.S. Cl.
CPC ............... *G07C 9/22* (2020.01); *G06F 21/34* (2013.01); *G06K 19/0723* (2013.01); *G06F 2221/2141* (2013.01)

(58) Field of Classification Search
CPC ....................................................... G07C 9/22
See application file for complete search history.

(56) References Cited

U.S. PATENT DOCUMENTS

| 2011/0035338 A1 | 2/2011 | Kagan |
| 2011/0296512 A1* | 12/2011 | Dietrich ................ G06F 21/41 726/9 |

(Continued)

FOREIGN PATENT DOCUMENTS

| EP | 2469478 | 6/2012 |
| FI | 2469478 | * 6/2012 ............... G07C 9/00 |

(Continued)

OTHER PUBLICATIONS

European Office Communication with Extended Search Report Appln No. 21173882.8 dated Nov. 8, 2021.

*Primary Examiner* — Joseph H Feild
*Assistant Examiner* — Pameshanand Mahase
(74) *Attorney, Agent, or Firm* — McAndrews, Held & Malloy, Ltd.

(57) ABSTRACT

There is provided an access system for controlling access to an inspection area and a product inspection apparatus. The access system comprises an area access controller configured to control an inspection area access means for controlling access to an inspection area; a product inspection apparatus controller configured to control access to one or more functions of a product inspection apparatus within the inspection area; a first RFID reader configured to read an external RFID tag of a user; and one or more memory devices configured to store authorised RFID data corresponding to one or more RFID tags each associated with an authorised user. The area access controller is configured to receive, from the first RFID reader, first identification data indicative of the external RFID tag; receive, from at least one of the memory devices, the authorised RFID data; determine whether the external RFID tag is associated with an authorised user; and in dependence on the determination, output a control signal to control the inspection area access means to enable access to the inspection area. The product inspection apparatus controller is configured to receive second identification data indicative of the external RFID tag; receive, from at least one of the memory devices, the authorised RFID data; determine whether the external RFID tag is associated with an authorised user; and in dependence on the determination, output a control signal to enable access to one or more functions of the product inspection apparatus.

(Continued)

In this way, a same RFID tag may be used for an authorised user to both access the inspection area and log in to a product inspection apparatus.

13 Claims, 3 Drawing Sheets

(51) Int. Cl.
*G06K 19/07* (2006.01)
*G06Q 50/04* (2012.01)

(56) References Cited

U.S. PATENT DOCUMENTS

| | | | |
|---|---|---|---|
| 2013/0031611 A1* | 1/2013 | Barreto | G06Q 10/06 726/4 |
| 2013/0214898 A1* | 8/2013 | Pineau | H04W 4/023 340/5.6 |
| 2016/0026836 A1* | 1/2016 | Bousfield | G07C 9/29 340/10.1 |
| 2020/0314651 A1* | 10/2020 | Pirch | G07C 9/10 |

FOREIGN PATENT DOCUMENTS

| | | |
|---|---|---|
| JP | 2005151257 | 6/2005 |
| JP | 2010211703 | 9/2010 |

* cited by examiner

ACCESS SYSTEM

RELATED APPLICATIONS

The present application claims the benefit of United Kingdom (GB) Patent Application No. 2012346.9, filed Aug. 7, 2020, and of European (EP) Patent Application No. 21173882.8, filed May 14, 2021. The entireties of United Kingdom (GB) Patent Application No. 2012346.9 and European (EP) Patent Application No. 21173882.8 are expressly incorporated herein by reference.

FIELD OF THE DISCLOSURE

This disclosure relates to an access system. In particular, the disclosure relates to an access system for a product inspection apparatus and inspection area.

BACKGROUND

For the operation of machinery such as a product inspection apparatus, it may be desired to allow only certain registered users to operate the apparatus. This requirement may be fulfilled by the implementation of a log in system to the equipment controller. A database of registered users may be set up, and each registered user may log in such as with a username and password to access equipment functions.

Furthermore, access may be restricted to the area in which the machinery resides. In the case of product inspection apparatus, this area may be referred to as an inspection area and may comprise a room or otherwise enclosed area secured by an access means. Authorised users may be provided with a key or access card to enter the inspection area.

Although such restriction may be desired for example for security, it may cause inconvenience for a user of the apparatus.

It is an object of embodiments of the disclosure to mitigate one or more of the problems of the prior art.

BRIEF SUMMARY OF THE DISCLOSURE

In accordance with the present disclosure there is provided an access system, a controller and a method for controlling user access to a product inspection apparatus.

According to an aspect there is provided an access system comprising: an area access controller configured to control an inspection area access means for controlling access to an inspection area; a product inspection apparatus controller configured to control access to one or more functions of a product inspection apparatus within the inspection area; a first RFID reader configured to read an external RFID tag of a user; and one or more memory devices configured to store authorised RFID data corresponding to one or more RFID tags each associated with an authorised user. The area access controller is configured to: receive, from the first RFID reader, first identification data indicative of the external RFID tag; receive, from at least one of the memory devices, the authorised RFID data; determine whether the external RFID tag is associated with an authorised user; and in dependence on the determination, output a control signal to control the inspection area access means to enable access to the inspection area. The product inspection apparatus controller is configured to: receive second identification data indicative of the external RFID tag; receive, from at least one of the memory devices, the authorised RFID data; determine whether the external RFID tag is associated with an authorised user; and in dependence on the determination, output a control signal to enable access to one or more functions of the product inspection apparatus.

Further aspects are defined by the appended claims.

BRIEF DESCRIPTION OF THE DRAWINGS

Embodiments of the disclosure are further described hereinafter with reference to the accompanying drawings, in which.

DETAILED DESCRIPTION

Figure 1:
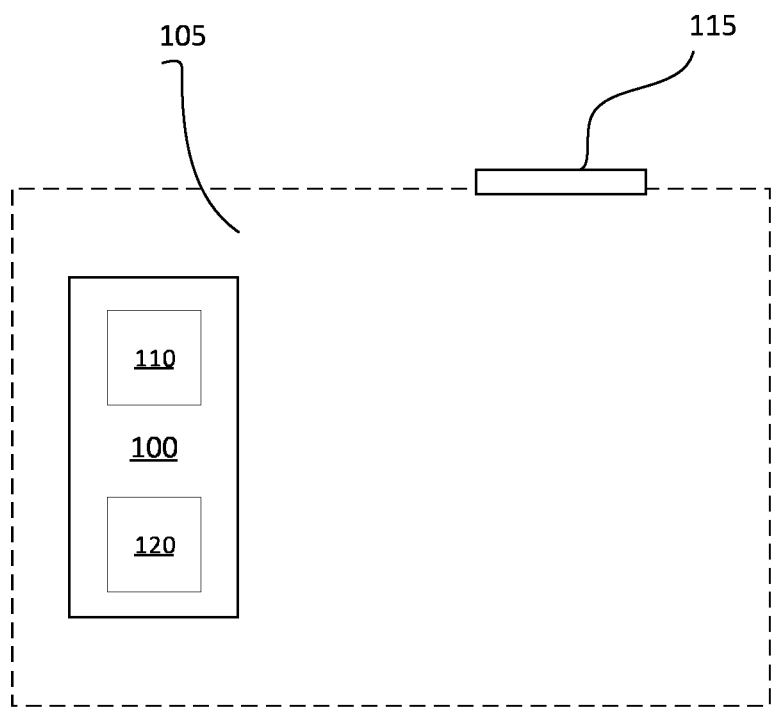
FIG. 1 illustrates an inspection area housing a product inspection apparatus.

FIG. 1 illustrates an inspection area 105 housing a product inspection apparatus 100. Embodiments of the disclosure provide a system and method for selectively allowing access to the inspection area 105 and the product inspection apparatus 100 for a set of authorised users.

The inspection area 105 may be a room or otherwise enclosed area housing the product inspection apparatus 100. The inspection area 105 may be secured by an inspection area access means 115 configured to control access to the area access means at an entry point such as a doorway. The inspection area access means 115 may comprise an electrically actuated closure such as a lock, being switchable between a first locked state and a second open state. Access to the inspection area 105 may be enabled by controlling the inspection area access means 115 to switch from the first locked state to the second open state. According to embodiments of the disclosure such access may be selectively granted to the set of authorised users, as will be explained.

The product inspection apparatus 100 may comprise one or more of a metal detector and a checkweigher, however it will be appreciated that embodiments of the disclosure may relate to any suitable piece of machinery for inspecting a product. The product inspection apparatus 100 comprises a user interface 110 configured to receive input from a user, and a product inspection apparatus controller 120. The product inspection apparatus controller 120 comprises an input for receiving a signal from the user interface 110 indicative of a command made by the user to perform one or more functions of the product inspection apparatus 100. The product inspection apparatus controller 120 comprises one or more processors 121 and a memory 122 storing computer readable instructions thereon, which when executed cause the product inspection apparatus controller 120 to process the user command and output a control signal to implement the one or more functions of the product inspection apparatus 100. The product inspection apparatus controller 120 is configured to control access to the one or more functions of the product inspection apparatus 100 depending on the identity of the user, as will be explained.

Figure 2:
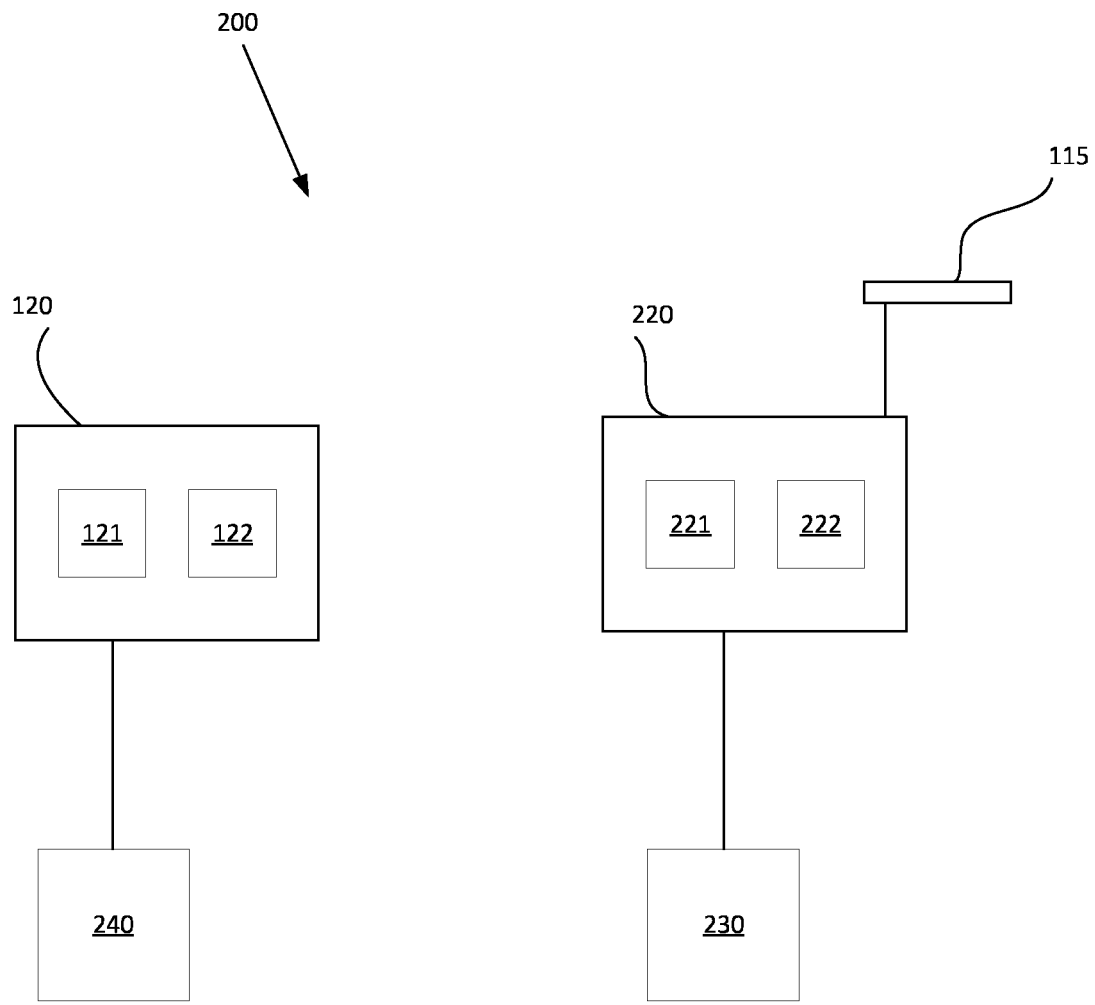
FIG. 2 illustrates an access system according to an embodiment of the disclosure.

FIG. 2 illustrates an access system 200 according to an embodiment of the disclosure. The access system 200 is configured to control access to the one or more functions of the product inspection apparatus 100 and to the inspection area 105. The access system 200 is arranged to selectively allow a subset of users, referred to as authorised users, access to the inspection area 105 and to implement one or more functions of the product inspection apparatus 100. The access system 200 may provide a unified means for each authorised user to access the inspection area and the one or more functions of the product inspection apparatus 100 whilst reducing burden on the user.

The access system 200 comprises the product inspection apparatus controller 120. The product inspection apparatus controller 120 is configured to control access to one or more functions of the product inspection apparatus 100 by performing a method according to an embodiment of the disclosure.

The access system 200 comprises an area access controller 220. The area access controller 220 is configured to control the inspection area access means 115. The area access controller 220 is configured to output a control signal to the inspection area access means 115 to switch the inspection area access means 115 between the first locked state and the second open state. In this way, access to the inspection area may be denied or granted to a user by the area access controller 220. Like the product inspection apparatus controller 120, the area access controller 220 comprises one or more processors 221 and a memory 222 storing computer readable instructions thereon, which when executed cause the area access controller 220 to perform a method according to an embodiment of the disclosure.

Although the area access controller 220 and the product inspection apparatus controller 120 are illustrated as two separate controllers in FIG. 2, it will be appreciated that in some embodiments they may be implemented on a single controller. In other embodiments, the functionality of each of the area access controller 220 and the product inspection apparatus controller 120 may be distributed across several communicably coupled controllers.

The access system 200 comprises a first RFID reader 230 configured to read an external RFID tag of a user. The first RFID reader is communicably coupled to the area access controller 220 and is configured to transmit to the area access controller 220 identification data indicative of the external RFID tag read. The access system 200 may optionally comprise a second RFID reader 240 configured to read the external RFID tag. According to some embodiments, the second RFID reader 240 is communicably coupled to the product inspection apparatus controller 120 and is configured to transmit identification data indicative of the external RFID tag to the product inspection apparatus controller 120. The first RFID reader 230 may be located outside the inspection area 105 or otherwise configured to read the external RFID tag from outside the inspection area 105. In this way, the first RFID reader 230 may read the external RFID tag of the user before they are granted access to the inspection area. In some embodiments, the second RFID reader 240 is associated with the product inspection apparatus 100. That is, the second RFID reader 240 may be integrated in the product inspection apparatus 100 or located proximal to the product inspection apparatus in the inspection area 105. The second RFID reader 240 is thus configured to read the external RFID tag of a user located already within the inspection area 105.

Each of the first RFID reader 230 and the second RFID reader 240 are configured to operate at the same RFID operating frequency. In this way they may be configured to read the same set of external RFID tags. According to some embodiments each reader 230, 240 may be configured to operate at a frequency between 13 and 14 MHz. For example, according to one embodiment of the disclosure, each of the first RFID reader 230 and the second RFID reader 240 may be configured to operate at a frequency of 13.56 MHz.

The access system 200 comprises one or more memory devices 122, 222 configured to store authorised RFID data corresponding to one or more RFID tags each associated with an authorised user. The authorised user may be an individual or in some embodiments a group of individuals. In FIG. 2 the memory devices 122, 222 are illustrated within the controllers 120, 220. However, in some embodiments the access system 200 may comprise one or more external memory devices accessible to the controllers 120, 220, for example via cloud based storage.

The authorised RFID data comprises a list of authorised users and one or more RFID tags associated with each authorised user. The authorised RFID data may further comprise an access level associated with each authorised user, and thus an access level associated with each RFID tag. The access level may define a set of permissions for the user. For example, the access level may define that the authorised user is permitted to access the inspection area 105 but not perform any functions of the product inspection apparatus 100. The access level may define a subset of functions of the product inspection apparatus 100 permitted to the authorised user.

Figure 3:
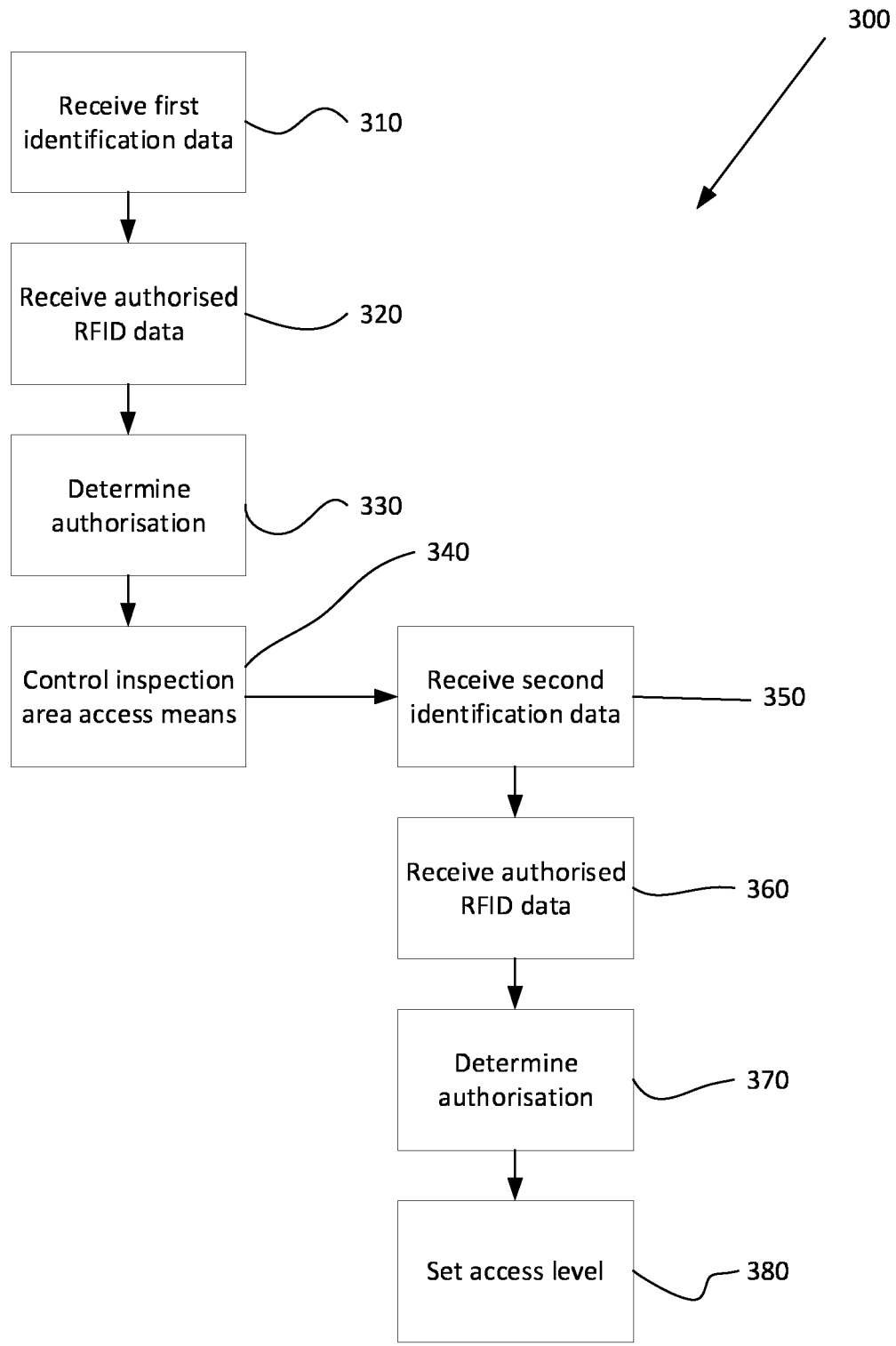
FIG. 3 illustrates a method according to an embodiment of the disclosure.

The access system 200 is configured to perform a method 300 for controlling access to the product inspection apparatus 100 and the inspection area 105. FIG. 3 illustrates the method 300 according to an embodiment of the disclosure.

The method 300 comprises a step 310 of receiving first identification data indicative of the external RFID tag. Steps 310 to 340 of the method 300 may be performed by the area access controller 220. Steps 310 to 340 may be performed by the area access controller. The first identification data may be received from the first RFID reader 230 following the first RFID reader reading the external RFID tag of a user.

The method 300 comprises a step 320 of receiving the authorised RFID data. The authorised RFID data may be retrieved from local memory 222 or received from an external storage device to which the area access controller 220 is communicable.

The method 300 comprises a step 330 of determining whether the external RFID tag is associated with an authorised user. The determination may be performed by comparing the external RFID tag to the RFID tags identified in the authorised data. If the external RFID tag corresponds to a tag associated with an authorised user in the authorised RFID data, it may be determined that the user is authorised. Step 330 may comprise identifying the access level of the user, if the access level is specified in the authorised RFID data. Step 330 may comprise identifying whether the access level permits the user access to the inspection area 105. If the user is permitted access to the inspection area 105, then step 330 may comprise determining that the user is authorised.

The method 300 comprises a step 340 of outputting a control signal to control the inspection area access means 115. The control signal may be output dependent on a positive determination in step 330. If the user is authorised, step 340 comprises outputting a control signal to the inspection area access means 115 to enable access to the inspection area 105, for example by switching from the first locked state to the second open state.

If the user is authorised, they are granted access to the inspection area. The method 300 comprises steps 350 to 380 for controlling access to the product inspection apparatus 100. The steps 350 to 380 may be performed by the product inspection apparatus controller 120.

The method 300 comprises a step 350 of receiving second identification data indicative of the external RFID tag. According to some embodiments, the second identification data may be received from the second RFID reader 240 following the second RFID reader reading the external RFID tag of a user. Alternatively, if only one RFID reader 230 is implemented, the second identification data may be received from either the first RFID reader 230 or from the area access controller 220. Thus it will be appreciated that in some embodiments the second identification data and the first identification data may be the same.

The method 300 comprises a step 360 of receiving the authorised RFID data. Step 360 may be performed analogously to step 320. That is, the authorised RFID data may be retrieved from local memory 122 or received from an external storage device to which the product inspection apparatus controller 120 is communicable.

The method 300 comprises a step 370 of determining whether the external RFID tag is associated with an authorised user. The determination may be performed analogously to step 330 by comparing the external RFID tag to the RFID tags identified in the authorised data. If the external RFID tag corresponds to a tag associated with an authorised user in the authorised RFID data, it may be determined that the user is authorised. Step 370 may comprise identifying the access level of the user, if the access level is specified in the authorised RFID data. Step 370 may comprise identifying one or more functions of the product inspection apparatus 100 that the user is permitted to control, and thus determining an access level of the product inspection apparatus 100 where each access level is associated with a different subset of available functions.

The method 300 comprises a step 380 of setting an access level for the product inspection apparatus 100 corresponding to the subset of permissible functions identified in step 370. Step 380 may comprise outputting a control signal to enable user access to the one or more permissible functions of the product inspection apparatus 100.

The method 300 may optionally comprise a step of storing access data indicative of the output control signal at one or both of steps 340 and 380. The access data may be stored in the one or more memory devices 121, 122. The access data may thus record a log of user access, to the inspection area 105 and the product inspection apparatus 100, enabling user access to be audited. The access data may comprise an indication of the external RFID tag, the authorised user associated with the external RFID tag, the one or more functions enabled, and the time at which the access was granted.

The present disclosure thus provides an access system that allows users to utilise a single RFID tag to obtain access to an inspection area and to the product inspection apparatus. Further, each RFID tag may be provided with a configurable access level, enabling some users more comprehensive access than others. The storage of access data further allows each access event to be logged, in order to efficiently track user access.

It will be appreciated that embodiments of the present disclosure can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present disclosure. Accordingly, embodiments provide a program comprising code for implementing a system or method as claimed in any preceding claim and a machine readable storage storing such a program. Still further, embodiments of the present disclosure may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An access system comprising:
   an area access controller configured to control an inspection area access means for controlling access to an inspection area;
   a product inspection apparatus controller configured to control access to one or more functions of a product inspection apparatus within the inspection area after access to the inspection area has been granted by the area access controller;
   a first RFID reader configured to read an external RFID tag of a user; and
   one or more memory devices configured to store authorised RFID data corresponding to one or more RFID tags each associated with an authorised user;
   wherein the area access controller is configured to:
     receive, from the first RFID reader, first identification data indicative of the external RFID tag;
     receive, from at least one of the memory devices, the authorised RFID data;
     determine whether the external RFID tag is associated with an authorised user; and
     in dependence on the determination, output a control signal to control the inspection area access means to enable access to the inspection area; and wherein the product inspection apparatus controller is configured to:
receive second identification data indicative of the external RFID tag;
receive, from at least one of the memory devices, the authorised RFID data;
determine whether the external RFID tag is associated with an authorised user; and
in dependence on the determination, output a control signal to enable access to one or more functions of the product inspection apparatus.

2. The access system of claim 1, further comprising a second RFID reader configured to read the external RFID tag, wherein the product inspection apparatus controller is configured to receive the second identification data from the second RFID reader.

3. The access system of claim 2, wherein the first RFID reader and the second RFID reader are each configured to operate at a frequency between 13 and 14 Mhz.

4. The access system of claim 2, wherein the first RFID reader is located outside the inspection area, and the second RFID reader is associated with the product inspection apparatus.

5. The access system of claim 1, wherein the authorised RFID data comprises an access level associated with each RFID tag of an authorised user.

6. The access system of claim 5, wherein the product inspection apparatus controller is configured to select the one or more functions of the product inspection apparatus in dependence on the access level associated with the external RFID tag.

7. The access system of claim 5, wherein the area access controller is configured to determine the control signal to control the inspection area access means in dependence on the access level associated with the external RFID tag.

8. The access system of claim 1, wherein the product inspection apparatus comprises one or both of a checkweigher or a metal detector.

9. The access system of claim 1, wherein the product inspection apparatus controller is configured to store access data indicative of the output control signal in the one or more memory devices.

10. The access system of claim 9, wherein the access data comprises an indication of one or more of: the external RFID tag, the authorised user associated with the external RFID tag, and the one or more functions enabled.

11. The access system of claim 1, wherein the one or more functions are a subset of functions of the product inspection apparatus determined based on the authorized user.

12. A computer-implemented method for controlling access, the method comprising:
reading, at a first RFID reader, an external RFID tag of a user;
receiving, at an area access controller, first identification data indicative of the external RFID tag from the first RFID reader;
retrieving, by the area access controller, authorised RFID data corresponding to one or more RFID tags each associated with an authorised user;
determining whether the external RFID tag is associated with an authorised user;
in dependence on the determination, outputting a control signal to an inspection area access means to enable access to an inspection area;
reading, at a second RFID reader within the inspection area, the external RFID tag of the user;
receiving, at a product inspection apparatus controller, second identification data indicative of the external RFID tag from the second RFID reader;
retrieving, by the product inspection apparatus controller, the authorised RFID data;
determining whether the external RFID tag is associated with an authorised user; and
in dependence on the determination, outputting a control signal to enable access to one or more functions of a product inspection apparatus within the inspection area.

13. A non-transitory computer readable medium comprising computer readable instructions which, when executed, cause a processor to perform the method of claim 12.

* * * * *